(12) United States Patent  
Fulks et al.

(10) Patent No.: US 7,325,322 B2
(45) Date of Patent: Feb. 5, 2008

(54) ELECTRIC PARK BRAKE INCLINOMETER

(75) Inventors: Gary C. Fulks, Dayton, OH (US); Douglas E. Poole, Dayton, OH (US); John Edward Pozenel, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/345,003

(22) Filed: Feb. 1, 2006

(65) Prior Publication Data

US 2006/0168833 A1    Aug. 3, 2006

Related U.S. Application Data

(60) Provisional application No. 60/649,030, filed on Feb. 1, 2005.

(51) Int. Cl.
*G01C 9/00* (2006.01)
*G01C 9/10* (2006.01)
*H01H 35/02* (2006.01)

(52) U.S. Cl. ............... 33/366.24; 33/366.27; 33/391; 33/DIG. 1; 200/61.45 R; 200/61.45 M

(58) Field of Classification Search ............ 33/366.24, 33/366.27, 366.11, 366.12, 365, 355 R, 391, 33/DIG. 1; 200/61.45 R, 61.45 M, 61.48, 200/61.49, 61.51, 61.52; 355/205–207
See application file for complete search history.

(56) References Cited

U.S. PATENT DOCUMENTS 3,195,964 A * 7/1965 Sieurin ............... 310/90.5
3,535,664 A * 10/1970 Staar ............... 335/153
3,778,572 A * 12/1973 Matsui et al. ......... 200/61.45 M
3,854,109 A * 12/1974 Gotanda ............... 335/207
4,144,653 A    3/1979 Gardner ............... 33/391
4,262,275 A    4/1981 DeMarco et al. ........ 338/32
4,429,470 A    2/1984 Watanabe et al. ....... 33/395
4,503,299 A * 3/1985 Henrard et al. ........ 200/61.52
4,614,041 A * 9/1986 Darton et al. ......... 33/313
4,667,413 A    5/1987 Pitts ............... 33/344
4,811,491 A    3/1989 Phillips et al. ....... 33/366
5,332,876 A * 7/1994 Romano et al. ........ 200/61.52
5,365,671 A    11/1994 Yaniger ............... 33/366

(Continued)

FOREIGN PATENT DOCUMENTS

EP    0261443 A1    3/1988
EP    0325196 A1    7/1989
JP    05001913 A *  1/1993

*Primary Examiner*—Diego Gutierrez
*Assistant Examiner*—Amy R. Cohen
(74) *Attorney, Agent, or Firm*—Scott A. McBain

(57) ABSTRACT

A tilt sensor system (10) is provided comprising a housing (12), a magnetized region (13) within the housing (12), and a magnetized, articulated pendulum (14) magnetically coupled to the magnetized region (13) for suspending the pendulum (14) within the housing (12). In a particular embodiment, the tilt sensor system (10) is incorporated into a park brake system (50) including a park brake for securing a portion of a vehicle in a static condition, and a control system for actuating the park brake responsive to a tilt measurement from the tilt sensor system. In addition, the tilt sensor system (10) may be incorporated into (or functionally coupled to) other vehicle control systems adapted for receiving tilt-related information from the tilt sensor system for use in performing respective vehicle control functions.

17 Claims, 3 Drawing Sheets

U.S. PATENT DOCUMENTS

| | | | |
|---|---|---|---|
| 5,421,694 A * | 6/1995 | Baker et al. | 414/694 |
| 5,667,282 A * | 9/1997 | Kim | 303/3 |
| 5,948,028 A * | 9/1999 | Raad et al. | 701/37 |
| 6,295,871 B1 * | 10/2001 | Wei | 73/570 |
| 6,377,166 B1 * | 4/2002 | Cauchi | 340/429 |
| 6,543,147 B2 * | 4/2003 | Akieda | 33/366.24 |
| 6,826,844 B2 * | 12/2004 | Endo et al. | 33/366.24 |
| 7,031,818 B2 * | 4/2006 | Endres | 701/70 |
| 7,092,808 B2 * | 8/2006 | Lu et al. | 701/70 |
| 7,230,193 B2 * | 6/2007 | Chou | 200/61.45 R |
| 2005/0016005 A1 | 1/2005 | Voecks | 33/344 |

* cited by examiner

ELECTRIC PARK BRAKE INCLINOMETER

CROSS REFERENCE TO RELATED APPLICATIONS

This application claims the benefit of provisional application Ser. No. 60/649,030, filed on Feb. 1, 2005.

BACKGROUND OF THE INVENTION

The present invention relates to tilt sensors and, more particularly, to a tilt sensor usable for sensing the inclination or acceleration of a vehicle.

Tilt sensors are devices used to measure angular displacement of a vehicle or structure relative to a reference. Tilt sensors are used in a wide variety of industrial and transportation applications for measuring inclinations and accelerations.

Tilt sensors used to detect angular inclination or displacement with respect to a horizontal reference are known as inclinometers. The reference is typically supplied by the gravitational pull of the earth. Inclinometers typically comprise a fixed element that is rigidly mounted to a piece of equipment whose inclination is to be measured, a reference element that maintains a constant orientation with respect to a reference, a sensor that measures the angular displacement between the fixed and reference elements, and a suspension system that supports the reference element while allowing relative rotation between the elements.

In existing inclinometer designs, the sensing technologies and methods for suspending the reference element within the fixed element are relatively complex and expensive. For example, a gyroscopic inclinometer relies on the angular momentum vector of a rapidly rotating mechanical part to provide a reference orientation. Gyroscopic inclinometers require a mechanically complex suspension for the rotating part and are, therefore, expensive.

Inclinometers that utilize a suspended pendulum as the reference element rely on gravity to maintain a reference orientation, typically using a suspension system including bearings that allow the pendulum to continue to point downward as the orientation of the fixed element changes. Suspension systems utilizing bearings that allow rotation of the pendulum in more than one axis are also complex and expensive.

Capacitive inclinometers typically utilize conductive plates as part of the fixed element. The reference element is located between the plates of the fixed element. Changing the angular displacement of the reference element with respect to the plates changes the dielectric constant of the space between, and therefore the capacitance of, the plates. The change in capacitance is detected and converted to a corresponding tilt angle. Capacitive inclinometers typically require relatively complex circuitry to convert the change in capacitance to a corresponding change in tilt angle and a relatively complex mechanical suspension system to maintain the reference element between the plates without touching the plates.

Because of the relative complexity of sensing technologies and of methods for suspending the reference element within the fixed element, existing inclinometers are relatively costly and their use is usually restricted to industrial applications.

SUMMARY OF THE INVENTION

A tilt sensor system is provided comprising a housing, a magnetized region within the housing, and a magnetized, articulated pendulum magnetically coupled to the magnetized region for suspending the pendulum within the housing. In a particular embodiment, the tilt sensor system is incorporated into a park brake system including a park brake for securing a portion of a vehicle in a static condition, and a control system for actuating the park brake responsive to a tilt measurement from the tilt sensor system. In addition, the tilt sensor system may be incorporated into (or functionally coupled to) other vehicle control systems adapted for receiving tilt-related information from the tilt sensor system for use in performing respective vehicle control functions.

DETAILED DESCRIPTION

Figure 1:
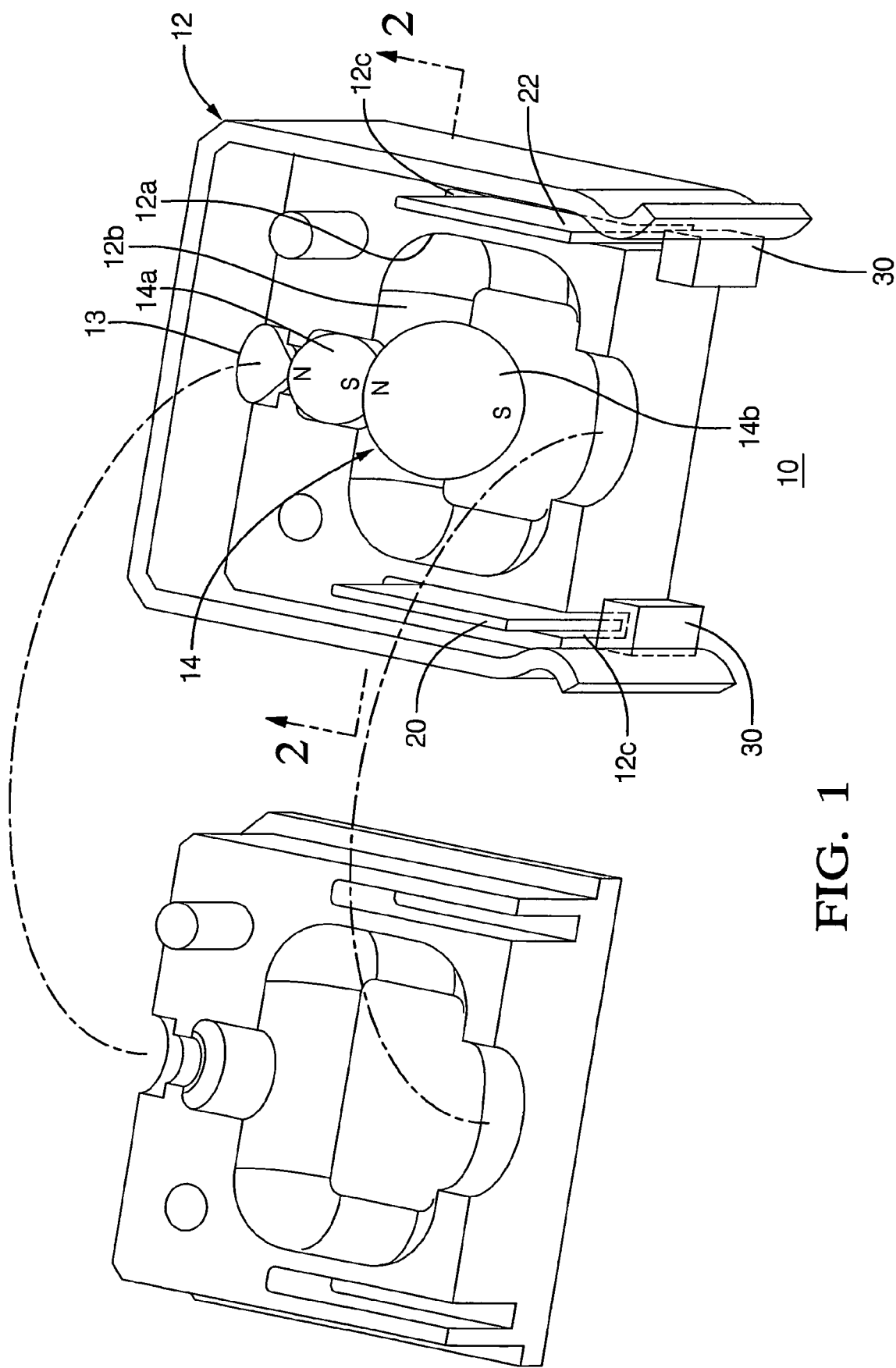
FIG. 1 is an exploded perspective view of one embodiment of a tilt sensor system in accordance with the present invention.

FIG. 1 shows one embodiment of a tilt sensor 10 in accordance with the present invention. Referring to FIG. 1, tilt sensor 10 includes a housing 12 having a plurality of walls 12a defining an enclosure 12b for containing other elements of the tilt sensor therein. Housing 12 is formed from a material having a relatively low magnetic permeability, for example a metallic material (such as aluminum or zinc) or a polymer material. Housing 12 may be fabricated using any suitable method(s) (such as die-casting, machining, molding, etc.), depending on the housing material and the desired geometry of the housing. In the embodiment shown in FIG. 1, housing 12 is machined from a pair of aluminum blocks which are joined and secured together to form the housing.

Enclosure 12b is sized in the aluminum blocks to accommodate a suspended reference element 14 in the form of an articulated pendulum (described in greater detail below). In addition, cavities 12c are provided in housing 12 to accommodate Hall effect sensor elements for detecting variations in magnetic fields representative of displacement of pendulum 14 with respect to housing 12. Enclosure 12b is also sized to accommodate angular displacement of pendulum 14 along a substantially planar arc due to tilt of housing 12. In a particular embodiment, shown in FIG. 3, enclosure 12b is formed with sufficient depth to enable angular displacement of pendulum 14 in any direction, thereby permitting measurement of tilt in three dimensions.

Housing 12 may include an exterior shell or layer (not shown) formed from a material having a relatively high magnetic permeability for providing shielding against any magnetic fields external to the housing. These external fields may otherwise interfere with the internal magnetic fields registered by the sensor elements for use in determining the tilt angle.

A magnetized region 13, to which pendulum 14 is magnetically coupled, is provided within the interior of housing 12. In the embodiment shown in FIGS. 1 and 2, magnetized region 13 comprises a magnet secured to a portion of housing 12 so that reference element 14 may be freely suspended therefrom. Any of a variety of methods may be used to secure magnet 13 to housing 12, for example adhesive attachment or insert molding. Magnet 13 may be fabricated by (or purchased from) any of a variety of vendors, for example Dura Magnetics, Inc. of Sylvania, Ohio.

In pendulum inclinometers, when the inclinometer housing is rotated about a horizontal axis, the pendulum tends to remain vertical. Consequently, there is a relative angular displacement between the pendulum and the housing. By measuring this relative displacement directly or indirectly, the inclination of the housing, and therefore of a structure to which it is attached, can be determined.

Referring again to FIG. 1, a reference element 14 comprising a magnetized, articulated pendulum is magnetically coupled to magnet 13 to suspend the pendulum within housing 12. In the embodiment shown in FIGS. 1 and 2, pendulum 14 includes a first generally spherical magnetized member 14a magnetically coupled to the magnetized region 13, and a second generally spherical magnetized member 14b magnetically coupled to first spherical member 14a. Each of first spherical member 14a and second spherical member 14b includes a magnetic pole formed proximate each of diametrically opposed portions of an outer surface of the respective spherical member. For example, FIG. 1 shows a north pole N and a south pole S formed proximate diametrically opposed portions spherical members 14a and 14b. In addition, spherical members 14a and 14b are magnetically joined together by abutting the north pole of member 14b and the south pole of member 14a. An outer surface of second member 14b abuts an outer surface of first member 14a so as to permit rolling contact between the first and second members. An outer surface of first member 14a abuts an outer surface of magnetized region 13 so as to permit rolling contact between the first member and the magnetized region. Also, in the embodiment shown in FIGS. 1 and 2, first member 14a has a diameter less than the diameter of second member 14b.

Properties such as the weight of first spherical member 14a, the force of magnetic attraction between first spherical member 14a and magnet 13, the weight of second spherical member 14b, and the force of magnetic attraction between second spherical member 14b and first spherical member 14a are specified so as to permit rolling contact between first spherical member 14a and magnet 13, and between second spherical member 14b and first spherical member 14a, in dynamic response to a tilt of housing 12, thereby enabling pendulum 14 to deflect and achieve a substantially vertical orientation under the influence of gravity. The weights of first and second spherical members 14a, 14b and the forces of magnetic attraction between the spherical members and between member 14a and magnet 13 are also specified such that the force of attraction between member 14a and magnet 13 is sufficient to maintain contact between first member 14a and magnet 13 while suspending the combined weight of both spherical members 14a and 14b.

Also, the weight of second member 14b and the force of magnetic attraction between second member 14b and first member 14a is specified such that the force of attraction between members 14a and 14b is sufficient to maintain contact between member 14b and member 14a while suspending the weight of spherical member 14b. In addition, the magnetic attraction forces between spherical members 14a and 14b is not so strong that the spherical members are prevented from angularly deflecting to in response to gravitational forces when a tilt is imparted to housing 12. Excessive magnetic attraction forces between first member 14a and magnet 13, or between second member 14b and first member 14a, may impart an undesired stiffness or rigidity to the magnetic couplings between magnet 13, member 14a, and member 14b. This stiffness may affect the response of the pendulum to a tilt of the housing and produce inaccuracies in the tilt measurement, which is derived from measurements of changes in the magnetic field impinging upon the Hall element sensors. The changes in the magnetic field as seen by the Hall element sensors result from angular deflection of spherical member 14b in response to the tilt imparted to housing 12.

The diameters of spherical members 14a and 14b may also be varied to affect the response of reference element 14 to a rotation of the housing. For example, in a case where motion of reference element 14 is damped using a dampening fluid, an increase in the diameter of member 14b will increase the viscous forces acting on the member during motion (due to the increase in the size of the cross-section acted on by the fluid), thereby slowing the response time of the reference element to the housing tilt. Thus, a spherical member 14b having a relatively larger diameter may be used to provide a greater degree of dampening without, for example, substituting a different dampening fluid. Also, an increase in the diameter of member 14b correspondingly increases the minimum distance to which the spherical member 14b north-south magnetic axis can approach the Hall sensors, thereby reducing the flux density seen by the Hall sensors. If desired, this effect can be offset, for example, by providing spherical member 14b with a relatively stronger magnetic field, by using a flux concentrator to increase the flux density seen by the Hall effect sensors, or by using a more sensitive Hall element sensor package to detect and respond to the relatively lower flux density. In contrast, a relatively smaller diameter spherical member 14b allows for a smaller tilt sensor system envelope; thus, the resulting tilt sensor system may occupy a smaller volume of space. These factors are considered and/or utilized in the design of the tilt sensor system to provide the desired dynamic system response. In summary, the sizes, compositions, and other features of spherical members 14a and 14b may be optimized to a particular application. In another embodiment (not shown), reference element 14 may comprise more than two magnetically coupled spherical elements.

Spherical members 14a, 14b may be fabricated using any manufacturing process(es) suitable for imparting spherical shapes to the members, while providing a magnetic pole proximate each of diametrically opposed portions of an outer surface of each of the members as described herein. In one embodiment, a spherical member is fabricated by insert molding a bar magnet into a sphere formed from a moldable material. In another embodiment, a spherical member is fabricated by inserting and securing a magnet into a diametral through hole formed in a prefabricated sphere. Other methods of forming spheres s14a and 14b are also contemplated. Magnets suitable for incorporation into first and second members 14a, 14b may be fabricated by (or purchased from) any of a variety of vendors, for example Dura Magnetics, Inc. of Sylvania, OH. In yet another embodiment, a magnetized spherical member may comprise a steel ball bearing magnetized to provide opossed north and south-seeking poles proximate respective diametrically opposed portions of an outer surface of the ball.

Figure 2:
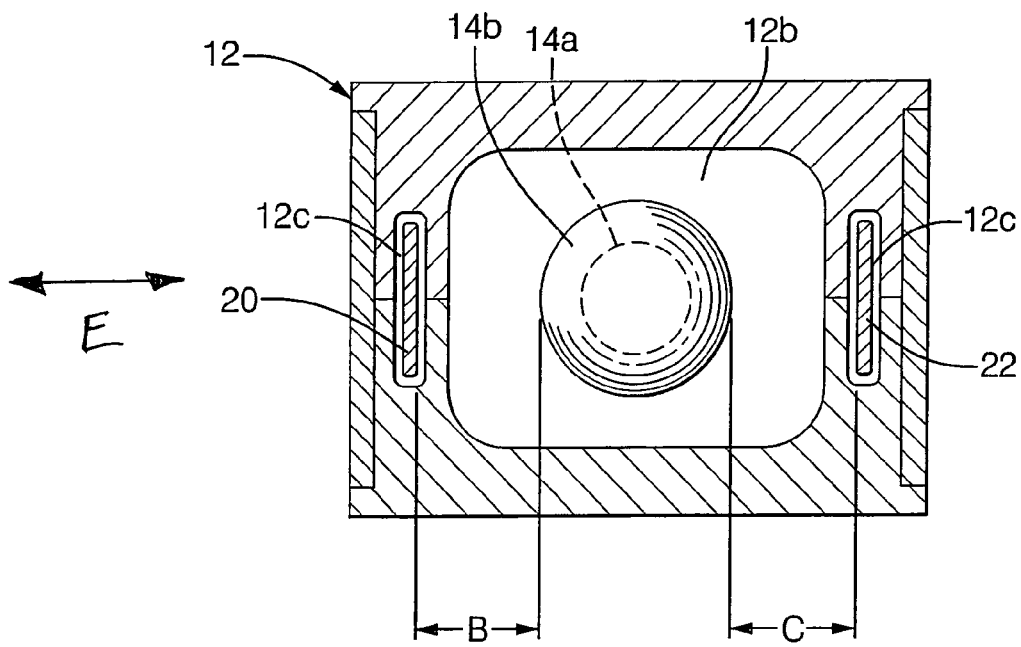
FIG. 2 is a cross-sectional underside view of the tilt sensor system embodiment shown in FIG. 1.

FIGS. 1 and 2 show a sensor arrangement in accordance with one embodiment of the present invention. In a typical implementation for measuring tilt along one axis, two Hall effect sensors 20 and 22 are mounted at 180° intervals (as viewed in FIG. 2), on opposite sides of pendulum 14. Cavities 12*c* are formed in housing 12 to accommodate the sizes and orientations of desired Hall effect sensor elements positioned proximate enclosure 12*b* to detect variations in the magnetic field generated by spherical member 14*b* as it undergoes angular displacement resulting from a tilt imparted to housing 12. In general, each Hall effect sensor element is oriented with respect to the magnetic field source (spherical member 14*b*) such that-the magnetic flux generated by the source has a component perpendicular to a flow of current along the active face of the Hall effect element. In the embodiment shown in FIGS. 1 and 2, the planes of the active faces of Hall sensor elements incorporated into sensors 20, 22 are oriented such that spherical member 14*b* moves along a path that is substantially perpendicular to the active faces of the Hall elements. The Hall effect sensor elements will be responsive to the component of the magnetic field that is perpendicular to the plane of the active face of the element. In this mode of operation, the outputs of the Hall effect sensors 20, 22 are responsive to the total effective air gaps between spherical member 14*b* and the respective Hall effect elements. Alternatively, one or more flux concentrators (not shown) may be incorporated into the sensor system to redirect or focus a portion of the magnetic flux, in order to help minimize the impact of sensor element and flux source orientation on the tilt measurements.

Alternatively, an integrated circuit or package may be used which incorporates therein one or more Hall effect sensor elements, flux concentrator(s), and additional circuit elements (such as amplifiers, filters, and comparator circuits) for performing voltage regulation, signal conditioning, temperature compensation, etc., as required. The integrated circuit includes one or more Hall effect sensor elements (i.e. Hall-effect regions or areas) as well as integrated circuitry associated with the Hall effect sensor elements in a common semiconductor substrate. Sensor packages suitable for the applications describe herein are available from a variety of vendors, for example, Allegro MicroSystems, Inc. of Worcester, Mass.

Figure 3:
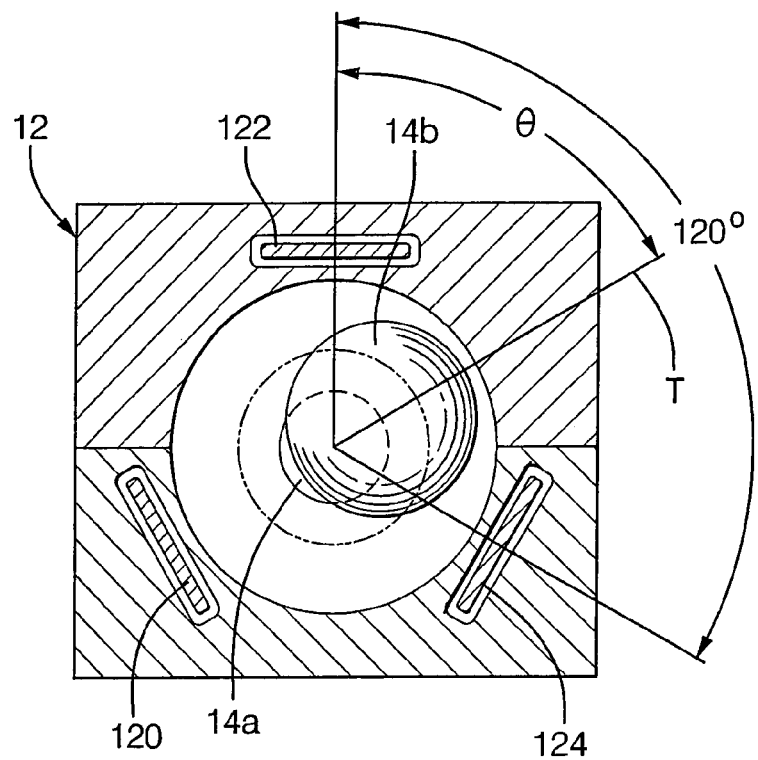
FIG. 3 is a cross-sectional underside view of an alternative embodiment of the tilt sensor system, showing a reference element deflected along a line T due to a tilt in a direction $\theta$ imparted to the tilt sensor housing.

Referring now to FIG. 3, in an alternative embodiment configured for measuring tilt in three dimensions, Hall effect sensors or sensor packages 120, 122, 124 may be spaced apart approximately 120°. The magnetic flux seen by each sensor element is used to determine the effective air gap (and, therefore, the spacing) between spherical member 14*b* and each of respective sensor elements 120, 122, 124. The sensor readings may be electrically combined or integrated to triangulate a relative position of member 14*b* within cavity 12*b* corresponding to an angular deflection of pendulum 14 due to the tilt imparted to housing 12.

Figure 4:
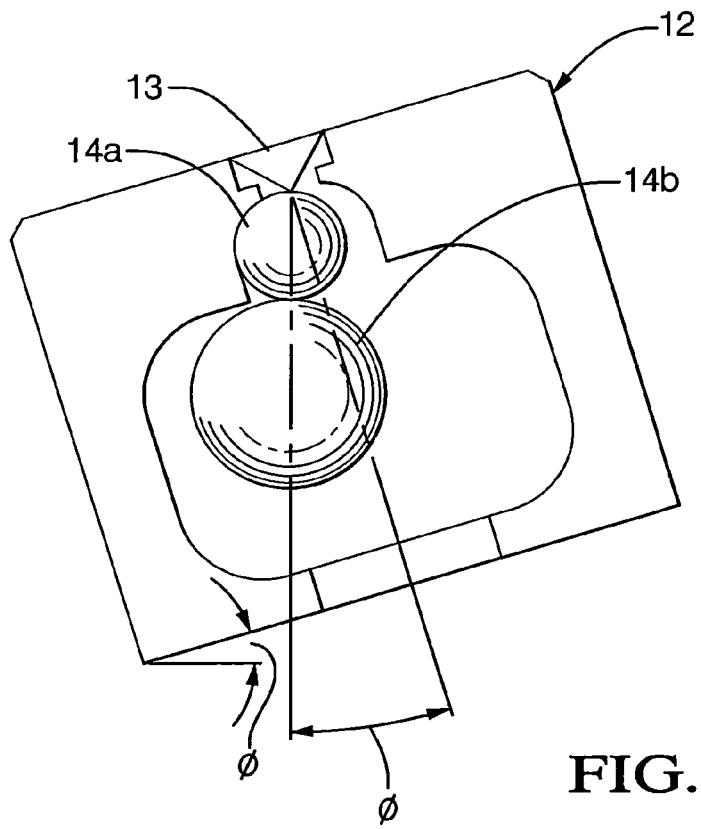
FIG. 4 is a cross-sectional side view of the tilt sensor embodiment of FIG. 3 showing a tilt of angle $\Phi$ imparted to the tilt sensor housing.

If desired, the sensor system may be calibrated prior to use by determining system response at various selected housing tilt angles and tilt directions. For example, in the embodiment shown in FIGS. 3 and 4, the distance of spherical member 14*b* from each sensor element may be determined primarily by a radial component (corresponding to pendulum deflection angle Φ and representative of the degree of housing tilt from the vertical), and an angular component θ (representative of the direction of housing tilt). In FIG. 3, pendulum 14 is shown deflecting in a direction corresponding to angle θ in response to a rotation of housing 12 in a plane extending through line T and perpendicular to the plane of the drawing figure. Housing 12 is also shown rotated about an axis in the plane of the drawing figure and perpendicular to line T, to a housing tilt angle Φ. The magnetic field strength seen by the Hall effect element is a function of such factors as the distance of spherical member 14*b* from the Hall effect element, the shape of the magnet generating the field, and the configuration of the magnetic circuit (for example, whether or not a flux concentrator is employed). The interpretation of the output signals can also include compensations for variations in the earth's magnetic field.

Operation of the tilt sensor will now be discussed with reference to FIGS. 1 and 2.

In operation, the angular displacement between housing 12 and pendulum 14 is sensed and indicates the inclination of the housing or the acceleration of the tilt sensor. As the angle between pendulum 14 and housing 12 changes, the proximity of spherical member 14*b* to each of Hall effect sensor elements 20, 22 changes, and the orientation of the spherical member with respect to each of Hall effect sensor elements 20, 22 changes, thereby changing the output of the sensors. The outputs of the Hall sensor elements are electrically combined or integrated to produce an electrical signal corresponding to the tilt angle. When coupled to suitable signal conditioning and output circuitry, the tilt sensor disclosed herein may also be employed as an accelerometer.

In a particular embodiment (not shown), a flux concentrator may be positioned in housing 12 so as to increase the flux density of the magnetic field generated by spherical member 14*b* in the vicinity of the Hall effect sensor elements 20, 22. In a manner known in the art, the magnetic field produced by spherical member 14*b* induces a corresponding magnetic field in a suitably positioned flux concentrator. The flux density of the induced field is increased, making it easier for the sensor element to detect variations in the field. The flux concentrator is formed from a material having a high magnetic permeability, for example a ferrous or nickel alloy. Various shapes of flux concentrator may be used depending on considerations such as the configuration of the Hall effect sensor elements used and the housing design. For example, C-shaped concentrators or cylindrically-shaped concentrators may be used. Alternatively, a flux concentrator may be incorporated into an integrated circuit package including the Hall effect sensor elements and other circuit elements (as described above) used for operation of the Hall effect sensor system.

Enclosure 12*b* shown in the embodiment of FIGS. 1 and 2 is designed to substantially constrain the motion of pendulum 14 within a given plane, enabling the pendulum to swing in the directions indicated by arrows E. If the tilt sensor is subjected to mechanical vibration, pendulum 14 may begin to oscillate about the pendulum swing axis. Such oscillations may become particularly large when the frequency of vibration approaches the pendulum swing frequency. To help minimize the effect of such vibrations, pendulum 14 may be damped relative to housing 12. That is, relative movement between pendulum 14 and housing 12 may be used to dissipate the kinetic energy of the oscillating pendulum as heat, for example using friction or by first converting the kinetic energy into electrical energy and then dissipating the electrical energy as heat in a resistance. As used herein, the term "damping" refers to any suitable means for dissipating the kinetic energy of pendulum oscillation as heat energy. Also as used herein, the term "pendulum swing axis" refers to the axis about which pendulum 14 is considered to be rotating at any instant in time. In the case of a simple pivoted pendulum as seen in the embodiment shown in FIGS. 1 and 2, the pendulum swing axis is the axis of the pivot. In the support shown in FIGS. 3 and 4 and described herein, the orientation of the pendulum swing axis could vary with time.

In a particular embodiment of the invention, housing 12 is sealable and configured to receive and retain a fluid (not shown) within enclosure 12b for dampening the motion of pendulum 14 due to vibration of housing 12. For example, housing 12 may be filled with fluid through a sealable fill hole (not shown) after the housing is assembled. The viscosity of the fluid is such that pendulum 14 can respond to a change in housing orientation within an acceptable time, while the viscous drag on the pendulum elements remains sufficient to prevent excess motion due to vibration, and sufficient to protect the pendulum elements from mechanical shock resulting from sudden contact with housing 12. One example of a suitable dampening fluid is a medium viscosity, non-corrosive fluid, such as an ethyl glycol solution.

Due to the forces imparted to pendulum 14 by the viscous fluid, the pendulum reacquires a vertical orientation only after a period of time has elapsed after tilting of the housing. Consequently, the dynamic response of the tilt sensor is determined by the settling time required for the pendulum to return to a vertical orientation. This settling time is influenced by such factors as the mass of the pendulum and the viscosity of the dampening fluid, and these and other features of the tilt sensor are specified so as to achieve the desired dynamic system response.

Housing 12 may also be environmentally sealed to prevent contaminants from entering housing 12 and possible damaging or interfering with the operation of Hall effect sensors 20, 22 or pendulum 14.

Figure 5:
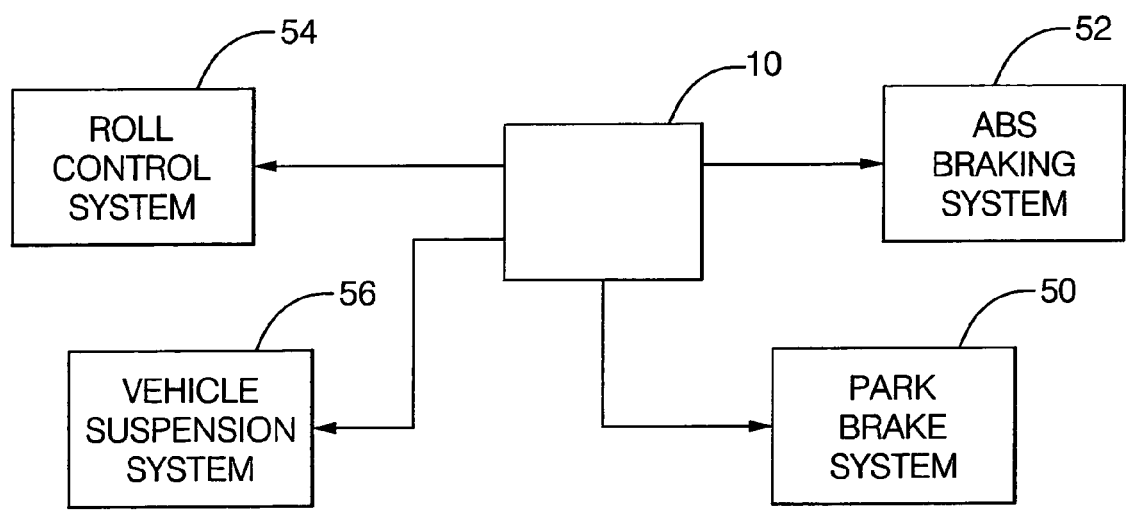
FIG. 5 is a schematic diagram of a tilt sensor system in accordance with the present invention operatively coupled to multiple systems of a vehicle.

Referring to FIGS. 1 and 5, any of a variety of types of connectors 30 may be coupled to housing 12 for connecting tilt sensor 10 to various components of other vehicle systems. In a particular embodiment, tilt sensor system 10 is incorporated into (or provides input to) a vehicle electronic park brake system, generally designated 50. Park brake system 50 may include, for example, a park brake (not shown) for securing a portion of a vehicle in a static condition, and a control system (not shown) for actuating the park brake responsive to a tilt measurement from the tilt sensor system. Output from tilt sensor system 10 is received as input by park brake system 50 and is used to help determine the braking force required to maintain an inclined vehicle in a static condition, thereby helping to prevent the vehicle from backsliding on inclines. In one mode of operation, the park brake applies a braking force to the portion of the vehicle to secure the portion of the vehicle in a static condition. The magnitude of the applied braking force is a function of the tilt measurement. Where the vehicle experiences a greater degree or angle of tilt (for example, when parking on a steeply-sloped surface), a proportionately greater braking force can be applied to help secure the vehicle in a static condition. Electronic park brake system 50 can also automatically lock and release the park brake when parking or starting the vehicle.

In addition, when coupled to suitable signal conditioning circuitry, the tilt sensor system of the present invention may be used to provide tilt-related information or signals to other vehicle control systems for use in performing their respective functions. Examples of such systems include vehicle roll-control systems, ABS braking systems, vehicle lean control systems, and vehicle suspension systems.

A tilt sensor system in accordance with the present invention provides several advantages over existing tilt sensor designs. Many existing tilt sensor designs use relatively complex and expensive active electronic systems to sense a tilt imparted to the device. In addition, many designs use relatively complicated and expensive mechanical suspension systems for suspending the reference element therein. The magnetically-suspended articulated pendulum of the present invention provides a low-cost alternative to these existing designs. The magnetic reference element suspension and connection mechanism described herein is simple and enables relatively low-friction rolling contact between elements of the pendulum, at relatively low cost. As well as reducing cost and manufacturing complexity, minimization of the number of moving parts and the simplicity of the pendulum deflection mechanism also minimizes the probability of system mechanical malfunctions occurring.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. A system for sensing tilt, comprising:
a housing;
a magnetized region within the housing; and
a magnetized, articulated pendulum magnetically coupled to the magnetized region for suspending the pendulum within the housing,
the pendulum including a first generally spherical magnetized member magnetically coupled to the magnetized region, and a second generally spherical magnetized member magnetically coupled to the first spherical magnetized member, and wherein an outer surface of the first spherical member abuts the magnetized region so as to permit rolling contact between the first spherical member and the magnetized region, and wherein the first spherical member has a first diameter, and the second spherical member has a second diameter, and wherein the first diameter is smaller than the second diameter.

2. The system of claim 1 wherein the magnetized region comprises a magnet attached to a portion of the housing.

3. The system of claim 1 wherein an outer surface of the second spherical member abuts an outer surface of the first spherical member so as to permit rolling contact between the first and second spherical members.

4. The system of claim 1 wherein each of the first spherical member and the second spherical member includes a magnetic pole proximate each of diametrically opposed portions of an outer surface of each of the first spherical member and the second spherical member.

5. The system of claim 4 wherein the second spherical member is magnetically coupled to the first spherical member by magnetic attraction between a pole of the second spherical member and an opposed pole of the first spherical member.

6. The system of claim 1 wherein at least one of the first spherical member and the second spherical member includes a magnet positioned within an interior thereof so as to provide a magnetic pole proximate each of diametrically opposed portions of an outer surface of the at least one of the first spherical member and the second spherical member.

7. The system of claim 6 wherein each of the first spherical member and the second spherical member includes a magnet positioned within a respective interior thereof so as to provide a pair of opposed magnetic poles proximate diametrically opposed portions of an outer surface of each of the first spherical member and the second spherical member.

8. The system of claim 1 wherein at least one of the first spherical member and the second spherical member comprises a steel ball magnetized to provide a magnetic pole proximate each of diametrically opposed portions of an outer surface of the at least one of the first spherical member and the second spherical member.

9. The system of claim 1 wherein the housing includes a material having a relatively high magnetic permeability positioned between the pendulum and an exterior of the housing for magnetically shielding at least a portion of the pendulum.

10. A park brake system comprising:
a tilt sensor system in accordance with claim 1;
a park brake for securing a portion of a vehicle in a static condition; and
a control system for actuating the park brake responsive to a tilt measurement from the tilt sensor system.

11. The park brake system of claim 10 wherein the park brake applies a braking force to the portion of the vehicle to secure the portion of the vehicle in a static condition, and wherein the magnitude of the braking force is a function of the tilt measurement.

12. A vehicle comprising:
a tilt sensor system in accordance with claim 1; and
a vehicle control system coupled to the tilt sensor system, wherein the vehicle control system is adapted for receiving tilt-related information from the tilt sensor system for use in performing a vehicle control function.

13. The vehicle of claim 12 wherein the vehicle control system comprises a vehicle roll-control system.

14. The vehicle of claim 12 wherein the vehicle control system comprises a vehicle lean-control system.

15. The vehicle of claim 12 wherein the vehicle control system comprises a vehicle suspension system.

16. The vehicle of claim 12 wherein the vehicle control system comprises an ABS braking system.

17. A system for sensing tilt, comprising:
a housing;
a magnetized region within the housing; and
a magnetized, articulated pendulum magnetically coupled to the magnetized region for suspending the pendulum within the housing,
the pendulum including a first generally spherical magnetized member magnetically coupled to the magnetized region, and a second generally spherical magnetized member magnetically coupled to the first spherical magnetized member, and the first spherical member having a first diameter, the second spherical member having a second diameter, and wherein the first diameter is smaller than the second diameter.

* * * * *